United States Patent
Thuresson et al.

(10) Patent No.: US 12,120,438 B2
(45) Date of Patent: Oct. 15, 2024

(54) IR-CUT FILTER SWITCH CONTROL

(71) Applicant: Axis AB, Lund (SE)

(72) Inventors: Axel Thuresson, Lund (SE); Ola Synnergren, Lund (SE)

(73) Assignee: Axis AB, Lund (SE)

( * ) Notice: Subject to any disclaimer, the term of this patent is extended or adjusted under 35 U.S.C. 154(b) by 84 days.

(21) Appl. No.: 18/153,465

(22) Filed: Jan. 12, 2023

(65) Prior Publication Data
US 2023/0254598 A1    Aug. 10, 2023

(30) Foreign Application Priority Data

Feb. 8, 2022    (EP) .................................... 22155570

(51) Int. Cl.
| | |
|---|---|
| *H04N 25/131* | (2023.01) |
| *G02B 5/20* | (2006.01) |
| *H04N 23/11* | (2023.01) |
| *H04N 23/667* | (2023.01) |
| *H04N 23/71* | (2023.01) |
| *H04N 23/74* | (2023.01) |

(52) U.S. Cl.
CPC .......... *H04N 25/131* (2023.01); *H04N 23/11* (2023.01); *H04N 23/667* (2023.01); *H04N 23/71* (2023.01); *H04N 23/74* (2023.01); *G02B 5/208* (2013.01)

(58) Field of Classification Search
CPC .... H04N 25/131; H04N 23/11; H04N 23/667; H04N 23/71; H04N 23/74; H04N 23/60; H04N 23/75; H04N 23/55; G02B 5/208
See application file for complete search history.

(56) References Cited

U.S. PATENT DOCUMENTS

| | | | |
|---|---|---|---|
| 9,386,230 B1 | 7/2016 | Duran et al. | |
| 10,313,589 B2* | 6/2019 | Chino | ..... G02B 7/006 |
| 10,339,638 B2* | 7/2019 | Hayashi | ..... H04N 23/667 |
| 10,395,347 B2* | 8/2019 | Tanaka | ..... G03B 11/00 |
| 10,586,351 B1* | 3/2020 | Brailovskiy | ..... H04N 23/667 |
| 2020/0314313 A1 | 10/2020 | Wang | |

FOREIGN PATENT DOCUMENTS

| | | |
|---|---|---|
| CN | 112770021 A | 5/2021 |
| WO | 2019/157096 A1 | 8/2019 |

OTHER PUBLICATIONS

Extended European Search Report dated Sep. 2, 2022 for European Patent Application No. 22155570.9.

* cited by examiner

*Primary Examiner* — Boubacar Abdou Tchoussou
(74) *Attorney, Agent, or Firm* — Volpe Koenig

(57) ABSTRACT

A method of performing better controlled switching between day mode and night mode imaging in a camera, where those illuminants contributing to the ambient light in day mode are considered when determining the visible light during night mode. Characteristic values of those illuminants are mixed with several levels of IR light to simulate the presence of an IR illuminator, and these characteristic values are compared to corresponding values derived from the color components of the ambient light in night mode in order to determine the IR proportion, and from that the amount of visible light.

14 Claims, 7 Drawing Sheets

IR-CUT FILTER SWITCH CONTROL

TECHNICAL FIELD

The present disclosure relates to a method performed in a video camera for controlling the switch of an infrared cut, IR-cut, filter between night mode and day mode.

BACKGROUND

Digital video cameras find many uses today, both for more traditional purposes as in video surveillance to deter criminal activities, and in other areas such as monitoring traffic situations or improving the operation of logistic centers.

Image sensors used in such cameras commonly have a spectral response with a non-negligible component in the infrared (IR) spectrum. To illustrate this, FIG. 2 shows the relative sensitivity of the three different color channels of a typical image sensor used in a monitoring camera.

In low-light conditions the IR-component of the ambient light may be used to provide useful additional information about the imaged scene. Alternatively, this characteristic also makes color imaging more difficult, since every color channel of a video camera will also have a spectral response in the IR, meaning that the blue, the green as well as the red color channels will all include IR-radiation, even though it actually resides at longer wavelengths than the red. The result of this is that during day-time imaging, any IR-component reaching the image sensor will distort the color balance in the image and may also saturate the image sensor. In addition, since the camera will detect the all the incoming radiation, parameters such as exposure settings may be affected in a way not supportive of good image quality.

A well-known way of maintaining the advantages of improved low-light imaging, while suppressing the less beneficial effects of distorted colors and possible saturation, is to add a movable infrared cut, (IR-cut,) filter in the beam path in front of the image sensor during day mode operation. The IR-cut filter stops the infrared portion of the incoming radiation from reaching the sensor. The IR-cut filter (sometimes denoted IR filter) is used during daylight conditions and enables acquisition of color images.

In day mode, with IR-cut filter in place, pixels of the image sensor will be able to detect the incident light as a charge on individual photodetectors, where each photodetector is provided with a color filter array so as to receive mainly red, mainly green, or mainly blue radiation, thus enabling color separation.

In night mode, i.e., in low-light conditions, the IR-cut filter is removed. This means that there will be an increase in intensity which originates in the IR portion of the spectrum, and this increase is used to improve the image quality. The camera may also be provided with an infrared illumination unit, providing infrared light to the scene and improving the image quality of images captured in low-light conditions.

It should again be noted that it will no longer be possible to provide color images when the IR cut filter is removed and no longer is blocking IR light from reaching the sensor. As mentioned, without the IR-cut filter, the IR radiation will add intensity in every color channel, since every color channel has a response in the IR part of the spectrum. This will skew the color information by the addition of an unknown factor in each color channel. Therefore, instead of performing a color separation during night mode operation, only the total intensity of the incoming radiation will be registered for each pixel, and the resultant image will normally be presented as a monochrome intensity image.

The camera will decide if night mode or day mode is appropriate based on the amount of ambient light being received by the sensor. However, when switching from night mode to day mode it is not uncommon for the camera to discover that after the switch, when the IR-cut filter blocks the IR part of the ambient light, the ambient light level is actually too low, thus prompting a switch back to night mode. This may result in an unfortunate back-and-forth switching between night mode and day mode, in turn resulting in noticeable flickering of the image, and unnecessary wear on the mechanism moving the IR filter.

Since such repeated switching back and forth is clearly not beneficial, an additional assessment may be performed by the camera prior to the switch, where the camera tries to determine the amount of visible light, not just the total amount of ambient light in the scene, to make certain that a switch to day mode is advisable. One alternative is to use an auxiliary light sensor (with an IR-cut filter) to measure the visible light in the scene. A downside to this option that it adds a further component to the camera, in turn increasing the cost and the complexity of the end-product.

U.S. Pat. No. 9,386,230 discloses an approach to this problem where the color temperature of various known light sources is compared to a color temperature measured from an image captured by a camera. The switch to day mode is only performed if the total lux level is high enough and different lux thresholds are used depending on if the identified light source is determined as sunlight or incandescent light which have a high infrared content or if the measured color temperature indicates that it is a non-IR light source.

When an infrared illumination unit is used to illuminate the scene, this will add further complexity to the estimation of when to perform the switch of the IR-cut filter. In U.S. Pat. No. 9,386,230 this situation is handled by refraining from performing measurements until the level of added infrared illumination is lowered substantially, and therefore does not contribute in any major way to the lux levels.

A method for determining whether a switch from night mode to day mode is advisable, based on an estimation of the proportion of IR in the acquired image or video, especially in the presence of an infrared illumination unit would be beneficial.

SUMMARY

Facilitating the switch between day mode and night mode, by providing better estimations of the amount of visible light in a monitored scene during night mode would be an improvement.

According to a first aspect, a method, performed in a video camera, of controlling an infrared cut, IR-cut, filter of the video camera, to switch between day mode and night mode, is provided, wherein the camera comprises an image sensor having a color filter array configured to allow the sensor to sense different color components at different regions of the sensor, comprising the steps of
  the image sensor measuring ambient light intensity and
    color components of the ambient light,
  in day mode,
    determining a set of illuminants present in the scene and
      contributing to the ambient light intensity, by comparing the color components to a first set of characteristic
      values associated with different illuminants,
    when the ambient light intensity is lower than a first
      threshold, switching to night mode, in night mode,
determining an IR light proportion of the ambient light intensity, by comparing the color components to a second set of characteristic values associated with different IR light proportions,
determining a visible light intensity based on the determined IR light proportion and the ambient light intensity,
when the visible light intensity is higher than a second threshold, switching to day mode,
wherein the second set of characteristic values is obtained by mixing a wavelength spectrum of each illuminant in the determined set of illuminants with a plurality of predetermined intensity levels of added IR light, such that the second set of characteristic values contains a plurality of characteristic values per illuminant, wherein the proportion of IR light per characteristic value in the second set comprises both IR light from the illuminant and the added intensity level of IR light.

Using this method, it will be possible to make a better-informed decision on when to switch the camera into day mode and reducing the back and forth switching of the IR filter caused by untimely switches into day mode by misjudgment of the amount of visible light in the scene due to strong IR light in the scene. Since the second set of characteristic values contains simulated values for the light sources in the scene with added IR light, it will be possible to estimate if the measured intensity of ambient light stems mostly from IR, mostly visible or somewhere in between.

By restricting the second set of characteristic values to only values associated to the set of light sources to only those contributing to the light in the scene, the number of characteristic values in the second set of characteristic values will be reduced to a reasonable amount that will give a high probability of a useful and unambiguous result when comparing to a measured value.

In contrast, in case all possibly available light sources mixed with several different IR light intensity levels would have been used, a chart presenting those values would have been far too densely populated to allow any kind of practical usefulness, since many results would have overlapped each other, making the determination of which values that were relevant to consider very uncertain. By instead reducing the light sources to the set of light sources determined to be contributing to the light in the scene in day mode, a much less densely populated chart of characteristic values is provided in night mode, and it will thereby be possible to decide which light sources, and more importantly, what levels of IR light is present in the scene.

It may be noted that throughout this description the terms IR and NIR are both used, since this is standard practice in imaging. However, in reality, it will only be this NIR part of the IR light that is relevant to the different aspects of the disclosure, due to the spectral response of the sensor in combination with the properties of color filter array. In case camera would be available that performed imaging both in the visible part of the spectrum as well as in other parts of the infrared region, i.e., outside the NIR region, the method described herein would be equally useful. However, with today's technology, imaging outside the visible and NIR spectral regions is done by other types of imaging devices, i.e., thermographic or thermal cameras, using, e.g., microbolometers, and in such cameras IR-cut filters are normally not relevant to use, and the present disclosure is therefore not used in those types of cameras. Accordingly, when the term "infrared" or "IR" is used herein, for the skilled person it will translate to radiation in the near infrared, NIR, region of the light spectrum.

The IR-cut filter is arranged to block IR light from reaching the image sensor of the camera in day mode and allow IR light to reach the image sensor in night mode.

The color filter array may be configured to allow the sensor to measure three different color components, which may be red, blue and green, this being a commonly used setup where standard components are available.

The comparison of the color components to characteristic values may comprise obtaining a first ratio of a first color component to one or more of the other color components and a second ratio of a second color component to one or more of the other color components, and comparing the obtained ratios to corresponding characteristic values of ratios.

This will give the possibility to take, e.g., three color components into account, using only two characteristic values, meaning that the comparison will be easier to perform.

The step of determining the set of illuminants may comprise utilizing a lookup in a first matrix table or accessing a first chart containing characteristic values associated with different illuminants, and the step of determining the IR light proportion may comprise utilizing a lookup in a second matrix table or accessing a second chart containing characteristic values associated with different IR light proportions.

Both of these options will provide an efficient way of storing and accessing the respective characteristic values for the comparison.

The method may be repeatedly performed at predetermined time intervals. In this way, changes in the lighting environment will be taken into account and up to date information is always available.

The first threshold may be lower than the second threshold. In this way back and forth switching is avoided by introducing a safety margin, so that when a switch between the modes has been performed, the camera will not immediately switch back, even if the ambient light intensity oscillates a small amount. This will in turn improve the image quality and the user experience by avoiding a flickering image.

The plurality of predetermined intensity levels of IR light preferably contains at least three different intensity levels. In this way it will be possible to determine more accurately which IR proportion corresponds to the ambient light in the depicted scene.

The plurality of predetermined levels of IR light intensities preferably contains IR light of a wavelength spectrum corresponding to a wavelength spectrum of an IR LED illumination unit mounted in the vicinity of the camera. In this way the characteristic values used for comparison in night mode will more closely match the measured values.

According to a second aspect, a video camera is provided comprising:
an image sensor having a color filter array configured to allow the sensor to sense different color components at different regions of the sensor, wherein the image sensor is configured to measure ambient light intensity and color components of the ambient light,
an infrared cut, IR-cut, filter which is configured to be controlled by the camera to switch between day mode and night mode,
wherein the camera is configured to,
in day mode,
determine a set of illuminants present in the scene and contributing to the ambient light intensity, by comparing the color components to a first set of characteristic values associated with different illuminants, when the ambient light intensity is lower than a first threshold, switch to night mode, in night mode, determine an IR light proportion of the ambient light intensity, by comparing the color components to a second set of characteristic values associated with different IR light proportions, determine a visible light intensity based on the determined IR light proportion and the ambient light intensity, when the visible light intensity is higher than a second threshold, switch to day mode, characterized in that the camera is configured to obtain the second set of characteristic values by mixing a wavelength spectrum of each illuminant in the determined set of illuminants with a plurality of predetermined intensity levels of added IR light, such that the second set of characteristic values contains a plurality of characteristic values per illuminant, wherein the proportion of IR light per characteristic value in the second set comprises both IR light from the illuminant and the added intensity level of IR light.

The video camera may comprise an IR LED illumination unit, wherein the plurality of predetermined levels of IR light intensities contains IR light of a wavelength spectrum corresponding to a wavelength spectrum of the IR LED illumination unit. The IR LED illumination unit provides better image quality during the dark hours, and by matching the predetermined levels of IR light intensity to the wavelength spectrum of the LEDs, the determination of the amount of visible light comprised in the ambient light will be more precise.

According to a third aspect, a non-transitory computer readable storage medium is provided, having stored thereon instructions for implementing the method, when executed on a device having processing capabilities.

The above mentioned features of the method according to the first aspect, when applicable, apply to the second and third aspects as well. In order to avoid undue repetition, reference is made to the above.

A further scope of applicability of the present disclosure will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that is the claims are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The description will now be set forth more fully hereinafter with reference to the accompanying drawings, in which currently preferred embodiments are shown. in the embodiments may take many different forms and should not be construed as limited to the embodiments set forth herein; rather, these embodiments are provided for thoroughness and completeness, and to fully convey the scope of the claims to the skilled person.

DETAILED DESCRIPTION

Figure 1:
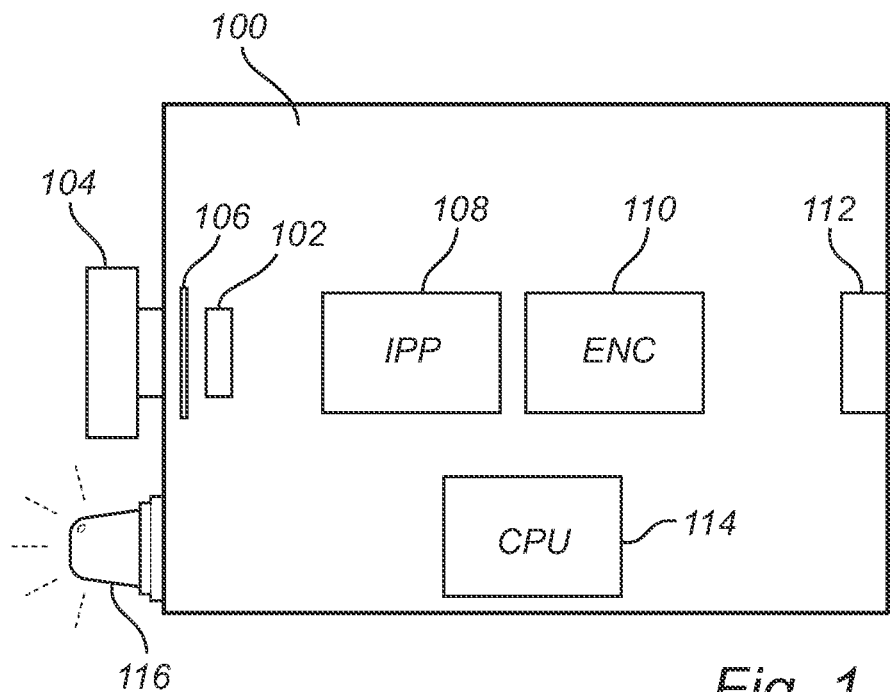
FIG. 1 illustrates a video camera.

FIG. 1 illustrates a monitoring camera 100. The camera has an image sensor 102 and imaging optics 104 which images a monitored scene on the image sensor 102.

The image sensor 102 comprises a plurality of imaging pixels, each being sensitive for radiation within a spectral region. Each pixel is equally sensitive within the spectral region, which ranges from near ultraviolet to near infrared, NIR, and possibly further into the infrared spectral region.

To provide color imaging, a color filter array is arranged in front of the sensor 102, providing each pixel of the sensor with a color filter in front of it. A common type of color filter array is the Bayer filter, which for each group of four pixels has one blue, one red and two green color filter units. A Bayer filter is transparent in at least part of the IR region of the light spectrum, namely in the near infrared, NIR, region. This fact, in combination with the spectral response of the image sensor 102, has the effect that NIR radiation will reach and affect each of the pixels of the image sensor. As mentioned previously, this is illustrated in FIG. 2.

To enable color imaging, an IR-cut filter 106 is therefore placed in front of the sensor. The IR-cut filter 106 is inserted in day mode imaging and retracted in night mode imaging.

The captured images are processed in an image processing pipeline, IPP, 108 for the generation of a video stream, and the video stream is then encoded according to an encoding standard, such as H. 264 or H. 265, etc., in an image encoding unit 110, and finally the encoded video stream is transmitted from the camera via a network interface 112. The video stream may also be stored locally in a memory provided for this purpose in the camera.

A central processing unit, CPU, 114 controls the operation of the camera 100. In a real-life situation the function of the CPU may be distributed over several different units, e.g., including a graphics processing unit, GPU, but for the purpose of this description, only a single unit is illustrated.

An illumination unit in the form of an IR illuminator 116 is provided to further improve the imaging capabilities of the camera when in night mode. In the illustrated embodiment the IR illuminator 116, e.g., in the form of one or more IR LEDs, is integrated with the camera 100, but it may also be provided as a standalone illuminator controlled by the camera 100, or as a separate unit. The IR illuminator 116 normally provides illumination in a wavelength interval centered around 850 nm or 940 nm. The latter interval is invisible to the human eye, while the former may be perceived as a red glow to a bystander.

Figure 3:
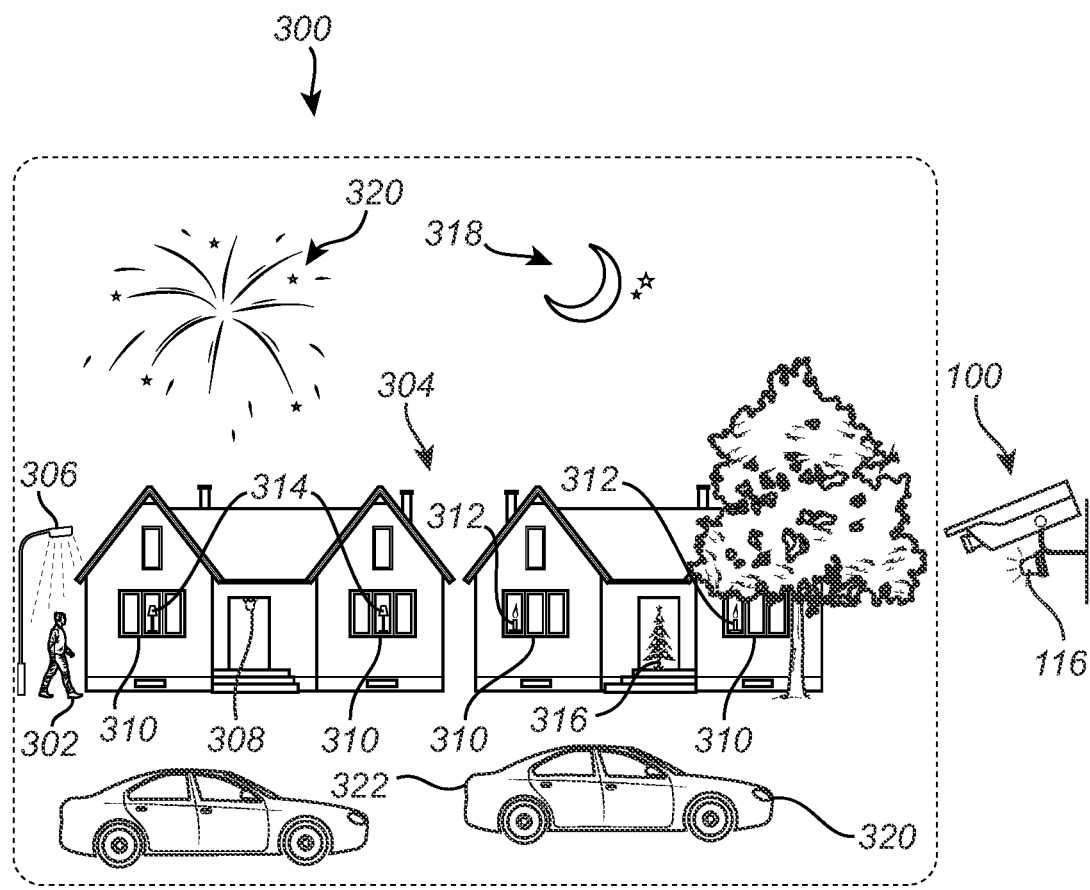
FIG. 3 illustrates an example of a monitored scene.

FIG. 3 illustrates a scene 300 imaged by the camera 100, where a person 302 is walking towards a row of houses 304. For the present disclosure it is of interest to note the lighting situation. Potential light sources in the scene are provided by the lamp post 306, the light fitting 308 above the entrance to one of the houses 304, and the light sources present inside of the windows 310 of the houses 304, such as candles 312, lamps 314 and fairy lights 316 on a Christmas tree. In addition to such artificial light sources, the sun is also an important source of light during dawn, day and dusk, and functions as an indirect source of light when reflected off the moon 318. Other light sources of intermittent nature, such as fireworks 320 and headlights of cars 322 may also appear in the scene from time to time.

Some of the light sources in the scene have a spectral component in the IR or NIR spectrum, in addition to their contribution to increased light in the visual spectrum. This is the case for incandescent lights (ordinary light bulbs with a tungsten filament), which are present in the lamps 314, as well as for burning flames, as in the lit candles 312, and also for sunlight.

As already described, the camera 100 is equipped with an IR illuminator 116, which is typically activated in night mode when the IR-cut filter 106 is removed and the camera performs imaging using also at least part of the near infrared to infrared spectrum. Thus, during night mode, the illumination available to the camera 100 will consist of the light from any light sources in the scene 300, in combination with the illumination from the IR illuminator 116, and the light from the light sources in the scene may both be in the visible part of the spectrum and in the IR part.

Returning to the key purpose of the present disclosure, namely to determine when it is advisable to perform a switch from night mode (without the IR-cut filter) to day mode (with the IR-cut filter), the IR component present during night mode imaging makes this a non-trivial task. A high intensity of IR illumination in night mode could easily make it appear as if the scene is well illuminated when, in fact, insertion of the IR-cut filter would render the acquired images far too dark.

A simple, but also slightly impractical, approach would be to simply insert the IR-cut filter and evaluate the situation, and then retract the filter again if the light levels are too low, or to shut off any IR-illuminators under control of the camera temporarily and perform the evaluation. Both options, however, are difficult to perform without visible effects in the video stream and will typically result in the disturbing flickering effect mentioned in the background section.

In order to provide a better and more efficient way of controlling the switch of the IR filter, information on which light sources are active in the scene would be of interest. A light source may generally be characterized by its spectral content, or color temperature. The spectral content of the images is in turn tied to the spectral content of the light sources via the spectral response of the image sensor and the effect of optical elements such as lenses and filters used in the camera. In other words, the spectral content of images will depend both on the illumination present in the scene and on the characteristics of the camera, especially the spectral response of the image sensor.

Figure 2:
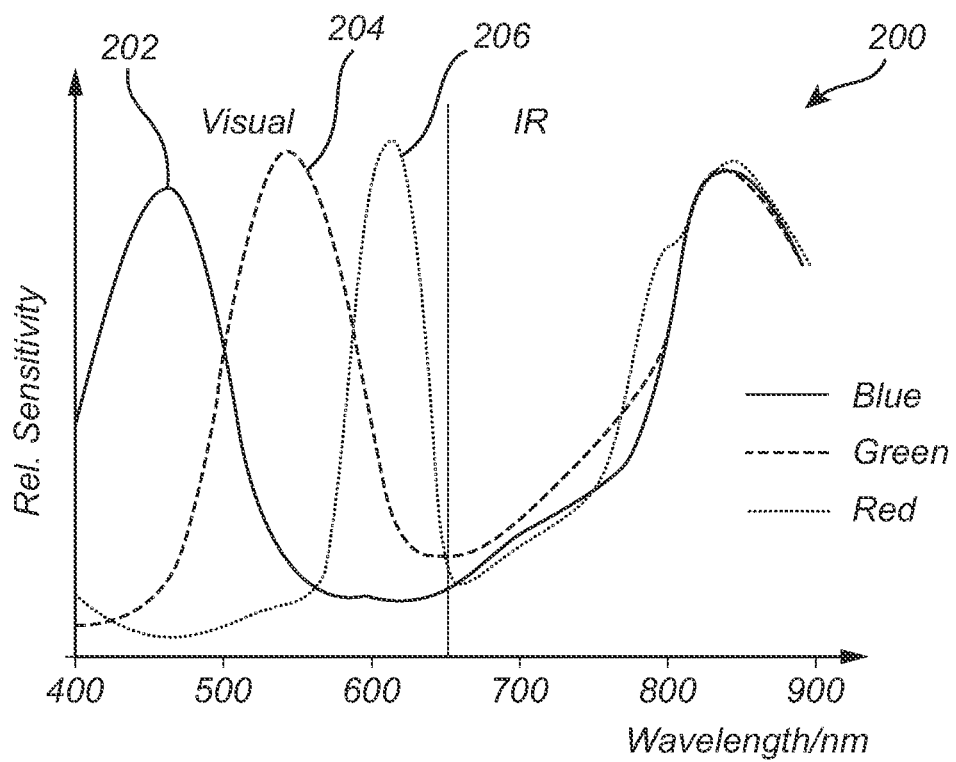
FIG. 2 shows a spectral response curve.

The latter is, as mentioned earlier, exemplified in FIG. 2 where a typical spectral response of an image sensor is illustrated. The graph in FIG. 2 shows the spectral response (or spectral sensitivity) for each color channel as a function of wavelength, the blue 202, the green 204 and the red 206. It is interesting to note in the graph that when the IR-cut filter is removed ("off"), i.e., in night mode, there is a spectral response in the NIR region, irrespective of color channel, and above 850 nm the response is largely equal. It is also apparent from the magnitude of the response how inclusion of IR or NIR may add significantly to imaging of the scene.

Figure 4:
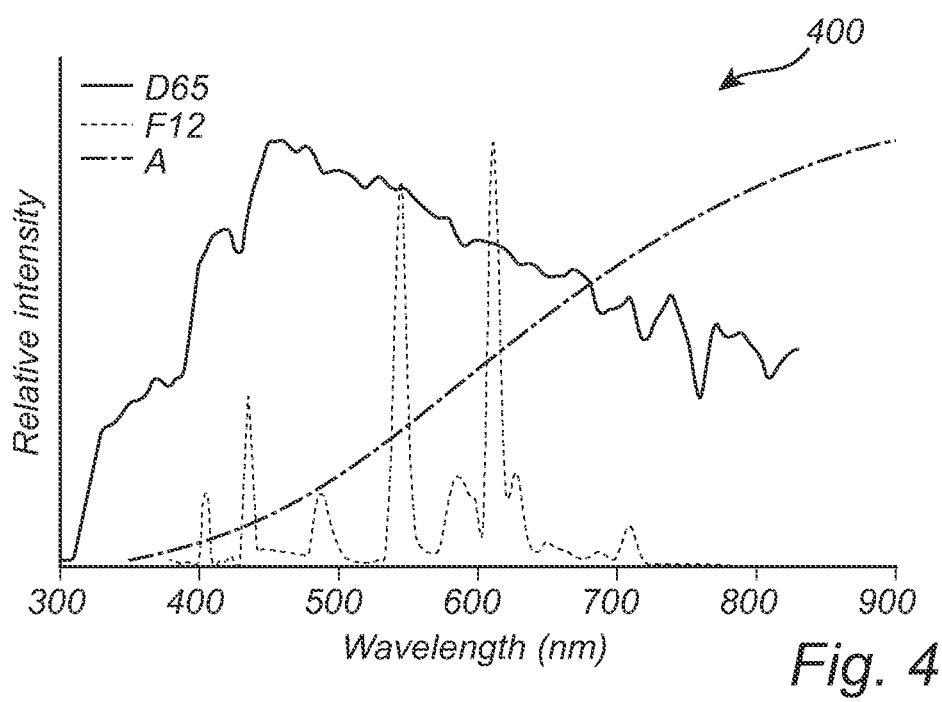
FIG. 4 illustrates different light source spectrums.
Figure 5:
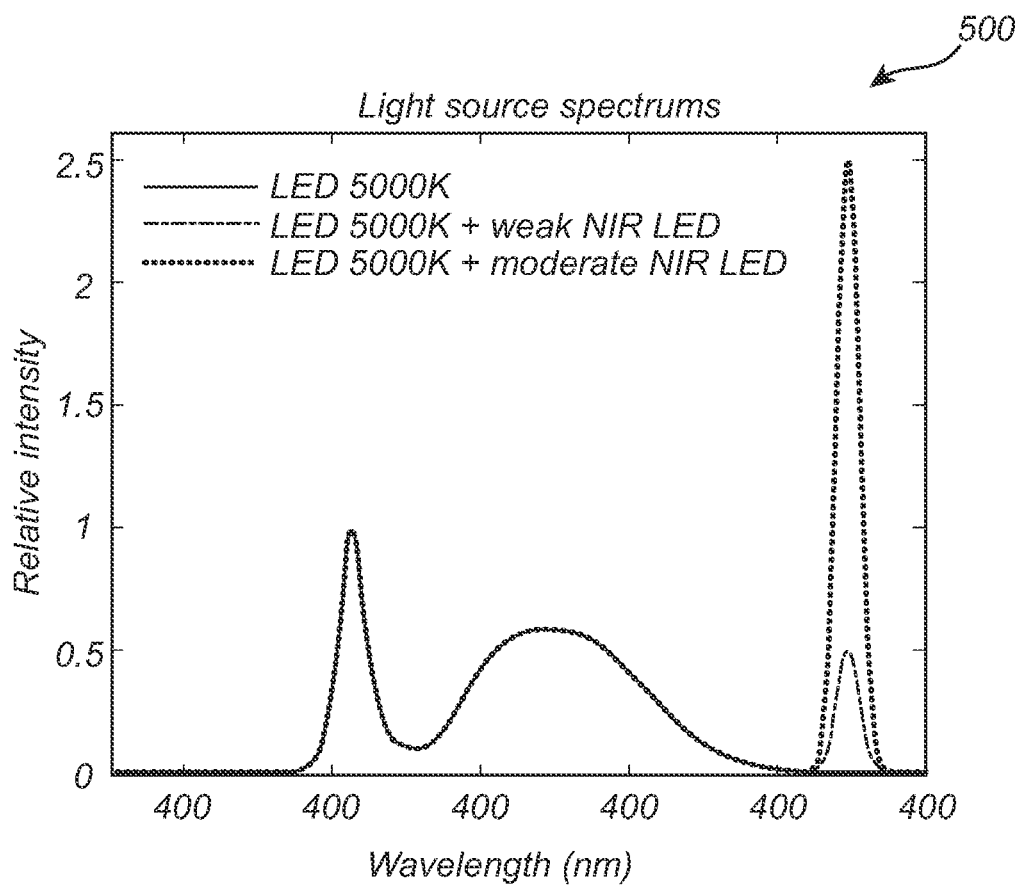
FIG. 5 illustrates different light source spectrums with added IR.

FIG. 4 on the other hand shows a diagram 400 of the spectral content for a number of different common light sources, where A is a black body radiator, F12 is a standardized fluorescent lamp and D65 is a simulated daylight spectrum, and FIG. 5 shows another diagram 500, where the spectral content of a visible light LED is combined with a NIR LED (850 nm) of different intensities.

A convenient—and well known in the context of white balancing—manner of condensing the characterization of the spectral content is to look at the different color components contributions, i.e., the sum or integrated amount of the intensity within specific wavelength intervals, which correspond to the color components.

Commonly, the color components are red, green and blue, but it would also be possible to use some other color space with other color components. Typically, two different ratios between components are used to make the characterization, such as r/g and b/g or r/(r+b+g) and b/(r+b+g), thereby reducing the complexity of the characterization to a coordinate in a two-dimensional chart or matrix table, while still maintaining information from all three color components.

Figure 6:
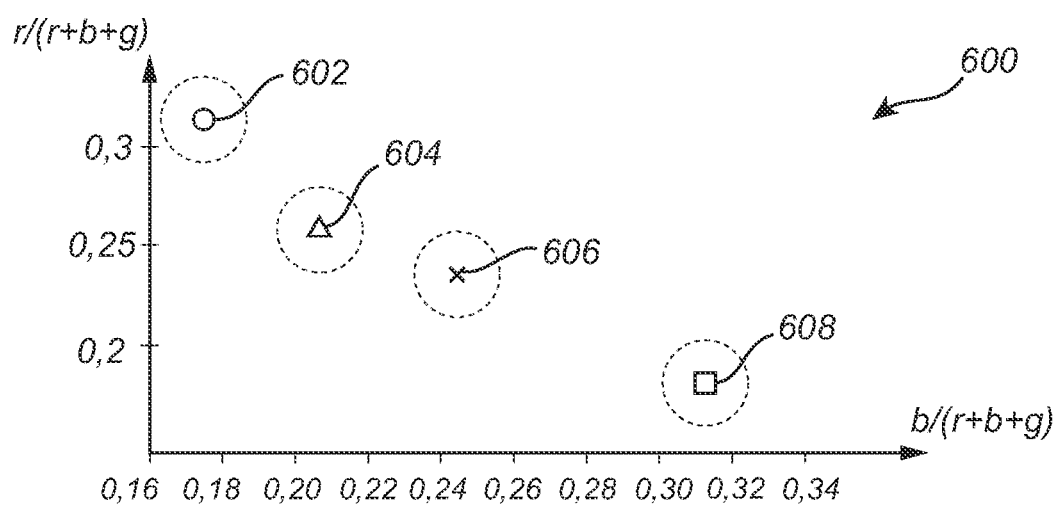
FIG. 6 is a chart showing characteristic values of a number of light sources.

FIG. 6 shows an example of such a chart where values of the red color component divided by the sum of all color components and the blue color component divided by the sum of all color components are plotted for a D75 light source (north sky daylight) at 602, an LED light source at 604, a fluorescent light source at 606 and a tungsten light source (i.e., a light bulb) at 608. The circle around each value symbolizes the fact that fluctuations may occur and that mapping to a certain light source may be done even if the exact same characterizing value is not found in a measurement from a real-life scene.

The chart in FIG. 6 is also possible to use when more than one light source is present in the scene. In that case, the measured values will, e.g., represent a mix of maybe two or three light sources. In such a situation the light sources that have the shortest Euclidian distances in the chart to the measured value may be determined to be present. Other more sophisticated method may also be used, such as first selecting the light source having the shortest Euclidian distance to the measured values, and then also including all those light sources that have Euclidian distance shorter than, say, three times this shortest distance. Various other method for selecting which light sources that are relevant to include are also possible.

While it is reasonably easy, based on a comparison of known characteristic values of light sources and the corresponding values of the captured image, to estimate the specific light sources that contribute to the illumination in the scene in day mode, i.e., when the IR component can be disregarded, it is not as simple to utilize this method in night mode, especially not in the presence of a strong IR or NIR illuminator.

The same principle of comparing characteristic values in night mode may be utilized, but with important modifications that allow the night mode analysis to be performed also in the presence of an IR illumination unit.

To start with, only those light sources that are determined to be present in the scene, according to the day mode analysis done just before the switch to night mode, are included in the night mode comparison. In this way there will be a much more sparsely populated chart to compare the measurements to than if all possible light sources were to be considered.

A set of modified characteristic values (also referred to herein as a second set of characteristic values) for each of the light sources that were determined to be active in day mode are provided, where an IR illumination wavelength spectrum at several different levels of intensity is added to each respective light source spectrum, and the modified characteristic values are calculated from these modified spectrums. The added IR illumination levels represent illumination from an IR illumination unit, such as the IR LED illumination unit 116.

As one option, these modified characteristic values could be determined by first preparing a large database with measurements for a large variety of light sources with added IR content at different intensity levels, and then selecting the appropriate values from the database. Such measurements are done today for different light sources in the context of preparing data used for white balancing purposes, and a similar setup could be used here as well.

In such a setup, the camera is configured to capture several images of an optically grey target while varying the output of light sources that are to be measured. A gradual addition of IR illumination is also introduced. These measurements may be performed with and without the IR-cut filter inserted, and the results are then analyzed to find the characteristic values of the various light settings. The setup may also be used to map the spectral response of the camera itself. The camera is then exposed to a narrow-banded radiation, such as with a FWHM of 10 nm, and this narrow-banded radiation is scanned across the entire spectral range of the camera (with the color filter array arranged in front of it), with and without the IR-cut filter arranged, and a result similar to what is shown in FIG. 2 is produced.

However, instead of performing such measurements for numerous different light sources, with different levels of added IR intensity, a much more convenient process is to determine the modified characteristic values from spectrums that result from calculating a mixture of the respective light source spectrums with IR illumination spectrums at different intensity levels, and then performing another calculation for determining how the image sensor will respond to these different spectrums with the IR filter removed.

Figure 7:
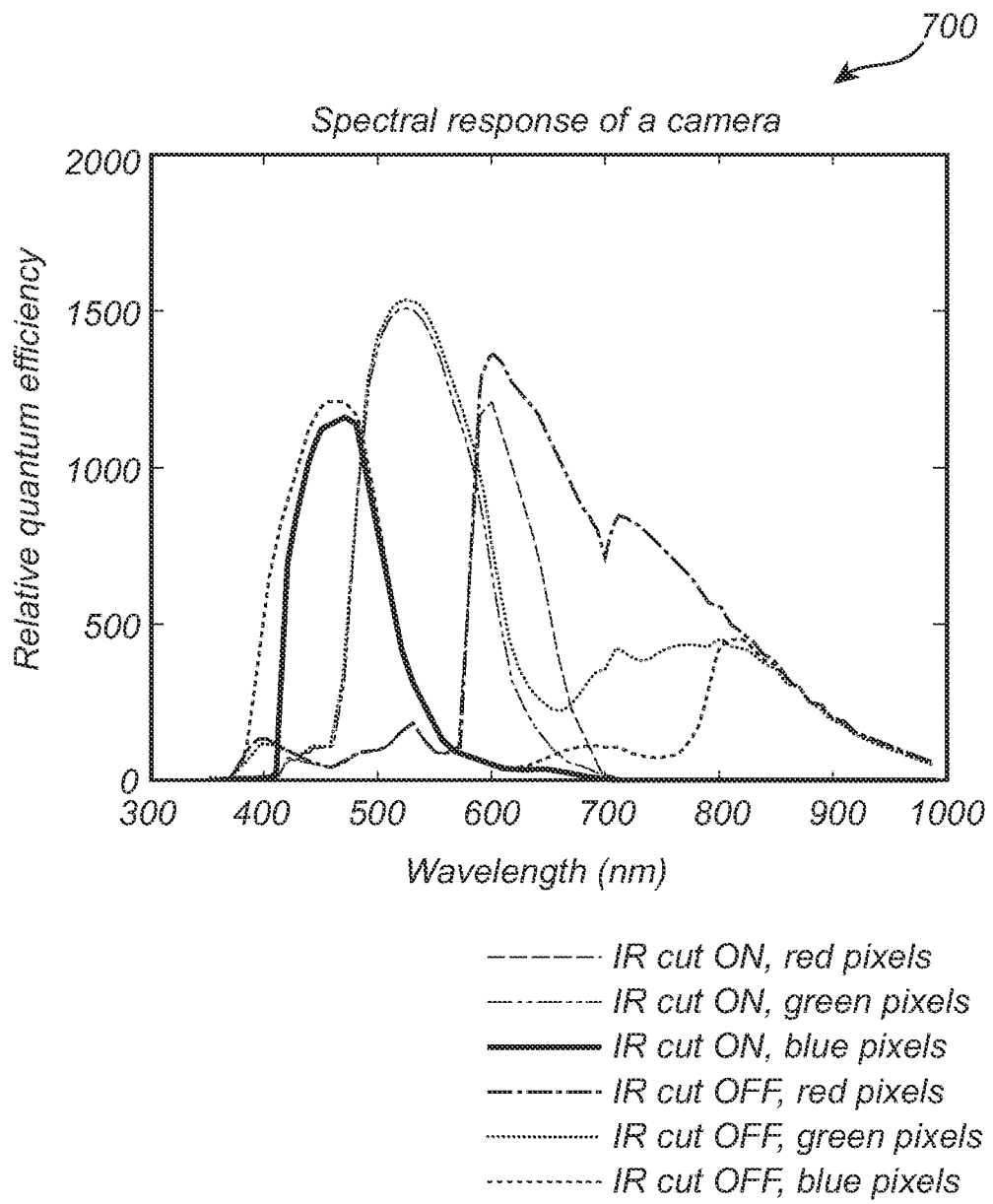
FIG. 7 show spectral response curves of a camera, with IR-cut filter on (in place) and off (removed).

As mentioned, image sensors are sensitive to IR over all color channels, which is illustrated in FIG. 2. In FIG. 7, the spectral response 700 of a camera is illustrated both in night mode, i.e., with the IR-cut filter removed, and in day mode, with the IR-cut filter in place. The spectral response in FIG. 7 differs somewhat from that shown in FIG. 2, since the illustration is from a different camera with a different image sensor and different optics.

By multiplying the spectral response for the camera, with the IR-cut filter in place and with the IR-cut filter removed, for one color channel at a time, with each of the generated spectrums, and then summing or integrating per color channel, the modified characteristic values for different IR illumination levels per light source are determined, as is the IR proportion associated with that particular value. As mentioned previously, this IR proportion will contain both the added IR illumination and the IR content of the respective light source.

In more detail, the calculations are done in the following manner, for each of the generated spectrums:

The total amount of light is calculated by multiplying the spectral response with IR-cut filter off with the generated spectrum, and determining the sum of all the color components (typically R+B+G).

The amount of visible light is calculated by multiplying the spectral response with the IR-cut filter in place with the generated spectrum and determining the sum of all the color components.

The visible fraction is calculated by dividing the amount of visible light by the total amount of light, and the IR fraction is calculated by subtracting the visible fraction from 1.

The characteristic value (in most cases the coordinate in the 2-dimensional chart) associated with that IR fraction is determined from the color components that were calculated with the IR-cut filter off, e.g., as R/(R+B+G) and B/(R+B+G).

Figure 8A:
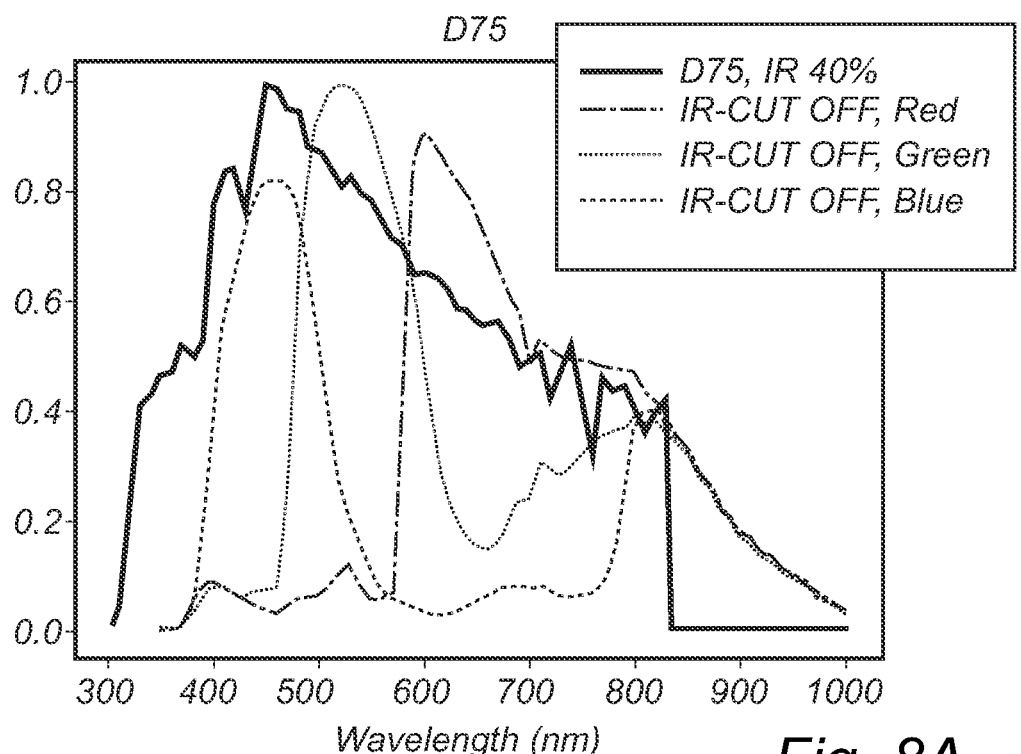
FIG. 8A shows a spectrum of a D75 light source overlaid on the spectral response curve of FIG. 7, with the IR-cut filter off.
Figure 8B:
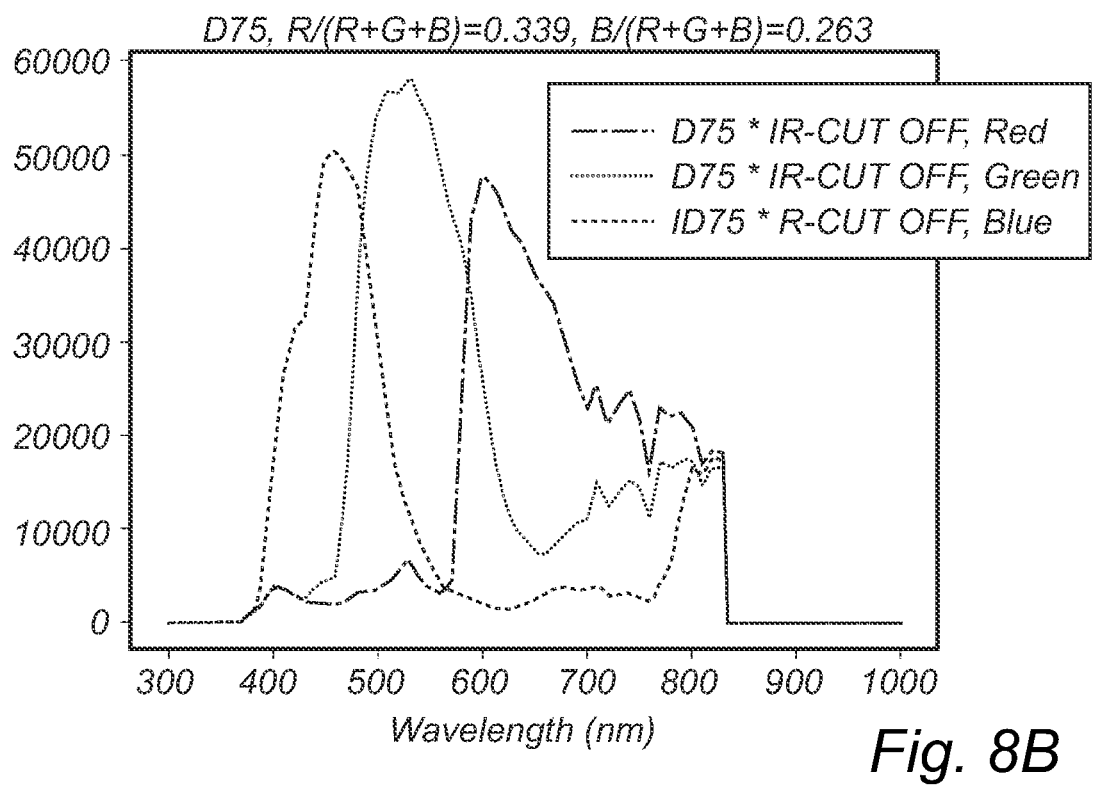
FIG. 8B shows the D75 spectrum of FIG. 8A multiplied with the spectral response curve of FIG. 8A.

The basis of such calculations is illustrated in FIG. 8, for a single light source, D75, which corresponds to north sky daylight, with 40% IR, i.e., the intensity of the IR part of the spectrum is 40% of the total intensity of the light source. In FIG. 8A, both the spectral content of the D75 light source with IR content, and the spectral response of the camera without IR-cut filter is illustrated. In FIG. 8B, the result of the multiplication between the D75 spectrum, and each of the color channel spectral responses is illustrated.

Figure 9A:
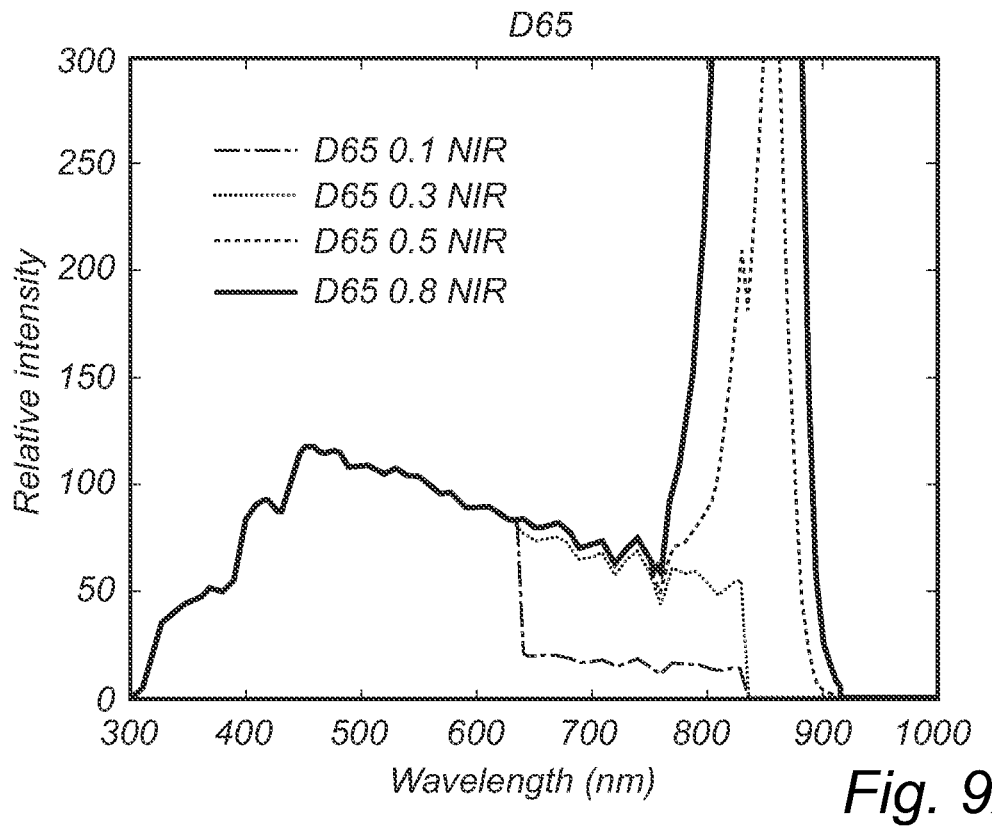
FIG. 9A shows spectrums of a D65 light source with different amounts of added IR.
Figure 9B:
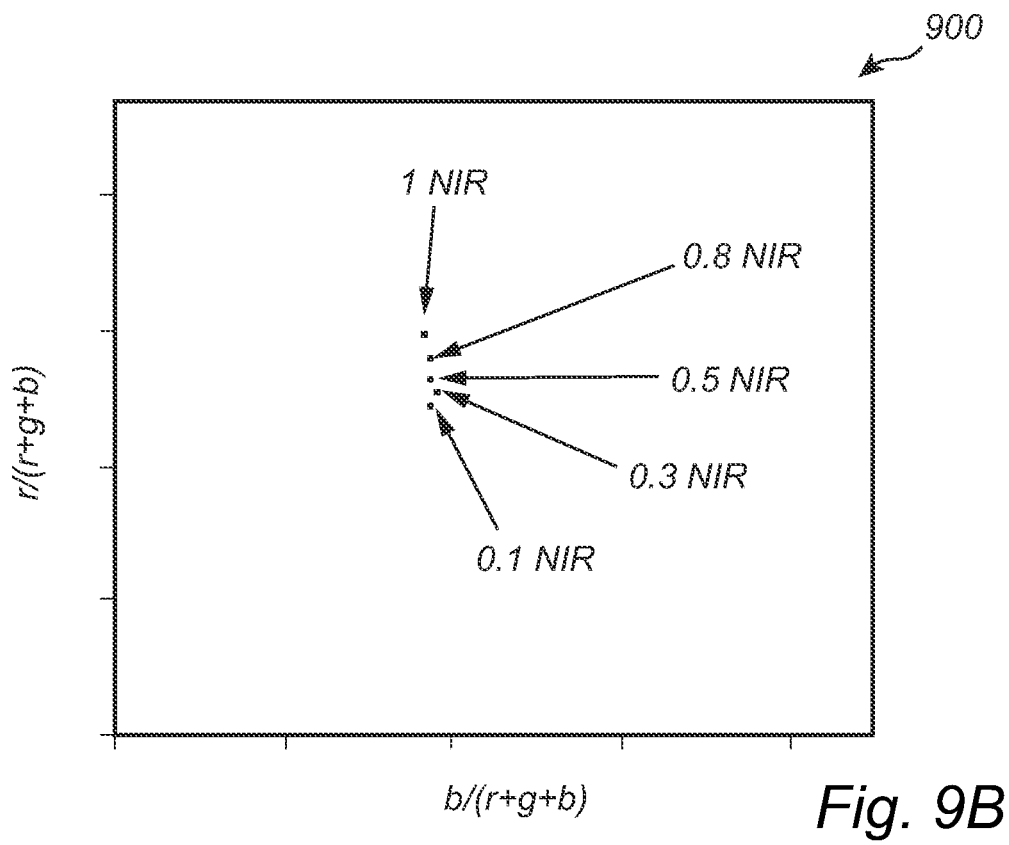
FIG. 9B is a chart containing a number of characteristic values for the spectrums in FIG. 9A.

In FIGS. 9A and 9B, another light source, D65, which corresponds to average midday light in western/northern Europe, mixed with different levels of IR illumination is illustrated. In FIG. 9A, the wavelength spectrums of a D65 light source when mixed with several levels of added IR light is shown. It may be noted that the y-axis has been truncated in this figure, for clarity of illustration. In reality the spectral curves for the higher levels of added IR continue up to a much higher amount.

These curves are then multiplied with the spectral response from the sensor with the IR-cut filter in the off position, as shown in FIG. 7, and characteristic values are calculated by first summing or integrating the intensity per color component and then determining the ratio of the blue color component to the sum of all the color components, as well as the ratio of the red color component to the sum of all the color components. The result of these calculations is visualized in the chart in FIG. 9B. A light source only containing IR has also been included. It may be noted that in a real-life situation, the levels of added infrared illumination might be chosen to be 70%, 80%, 90%, 95%, 97% and 98%.

In the context of the scene illustrated in FIG. 1, the herein presented method would work as follows:

When the camera is in day mode, measurements are made to determine the ambient light intensity from the captured images, as well as the color components of the ambient light. The color component measurements are used to calculate characteristic values, such as the mentioned r/(r+b+g) and b/(r+b+g), which are compared with a chart or matrix table listing such characteristic values for many different light sources. The light sources that have similar characteristic values to the measured image values are determined to be present or active in the scene, i.e., they are contributing to the light intensity in the scene.

The determination of the color components may be calculated by simply adding intensities for each pixel. This operation may be performed for all of the pixels of the image sensor, i.e., the entire depicted scene, or it may be performed only for a smaller region of the scene. In the latter example the smaller region may be a region having particular properties, such as a homogenous intensity, a region considered to be optically grey, etc.

Furthermore, instead of performing an addition of pixel values per color channel for the entire image, it would also be possible to perform the operation separately in various sub-regions, in which case the resulting color component measurements will have a spatial resolution, i.e., the values may differ over the image. This option may be used to sort out any spatially limited light sources, such as car headlights, that should not impact the decision to switch the IR-cut filter. As one example, if such deviating measurements, which could be seen as outliers, appear in some specific regions of the image repeatedly over time, these regions may be disregarded when determining the color components.

The measurements would in a real-life situation be made continuously, such as 15 times per second, over the entire day. However, it should be noted that the measurements that are of most interest are the ones made close to, i.e., just before, the point in time when the camera determines that the ambient light intensity is lower than the threshold for switching to night mode. Thus, the determinations of which light sources are active in the scene and contribute to the (albeit low level of) illumination just before the switch to night mode will form the basis of the information that will be used to determine when to perform the switch back from night mode to day mode, by being entered into a chart with modified characteristic values to be used for the determination in night mode.

Returning to the example illustrated in FIG. 3, the artificial light sources that are present in the scene (and possibly active) are the lamp post 306, the light fitting 308, the candles 312, lamps 314 and fairy lights 316. In addition to these artificial light sources, there would probably be a contribution from the setting sun, and possibly the moon 318. As mentioned, the fireworks 320 and headlights of cars 322 are of intermittent nature and would not contribute as much to the measurement and may be disregarded at present.

Each of the light source spectrums of the light sources that are determined to be present and active in the scene just before the switch to night mode will, as explained previously, be mixed with spectrums of several different levels of IR light. Then characteristic values, as well as the percentage of IR for that specific combination, will be calculated for all of the combinations of these light source spectrums and the added IR light levels. The added IR light levels typically represent different intensity levels of light from the IR LED illumination unit 116 at the camera 100, and the spectrum of the added IR light is preferably matched to the spectrum of the IR LED illumination unit, which is normally known when setting up the camera and its illumination unit.

As explained previously, in all those cases when a light source has part of its spectrum in infrared, this IR spectrum part will contribute to the total IR proportion of that light source, together with added IR light intensity level.

A total proportion of IR will be available for several different combinations of characteristic values in the night mode chart. In this context it may be mentioned that in the unlikely case that more than one combination of light source spectrum plus added IR light intensity level is associated with the same characteristic values, the pragmatic solution will be to simply to associate that point in the chart with the highest of the IR proportions.

Since there may be measurement inaccuracies or similar that cause a measured characteristic value not to precisely coincide with a value in the chart, various methods may be used to determine a most relevant populated point or points in the chart. Just as for the day mode chart, a straightforward choice is to use the Euclidian distance and select the populated point in the chart being closest to the measured point. Since there will in many cases be more than one light source active (and all of those will give rise to several points in the chart by being combined with several levels of IR), selecting two, three or four closest populated points may also be appropriate.

The amount of visible light available will then be determined from the point in the chart associated with the highest percentage of IR light. The amount of visible light is then determined as (1–"IR proportion associated with point in chart")*"measured ambient light intensity". Then this amount of visible light is compared to a second threshold value to determine if it would be pertinent to switch to day mode or not. In case the amount of visible light is lower than the second threshold, the switch will not be done, i.e., the IR-cut filter will stay in place, and in case the amount of visible light is higher than the second threshold, the camera will switch to day mode and retract the IR-cut filter.

The first threshold will normally be lower than the second threshold, in some cases 2 to 3 times lower, in other cases the second threshold may be set to be 4 times the first threshold, to provide a safety margin and avoid a back and forth switching between day and night mode. This measure may be seen as a way of introducing a hysteresis functionality. It may be noted that by using the method presented herein, it will in many cases be possible to reduce the distance between the first and the second threshold, so that more precise determinations needing less safety margin can be made, in turn meaning that better image quality can be provided by allowing use of night mode and day mode in the appropriate situations. This is due to the fact that the difference between the thresholds tends to be set partly based on the estimated amount of IR in the scene.

Figure 10:
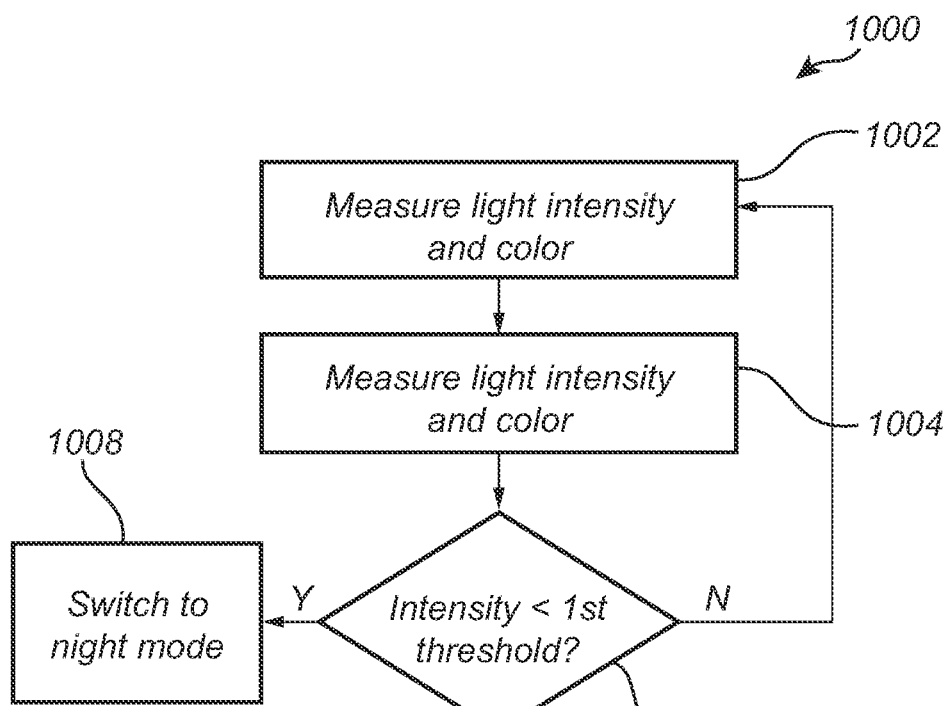
FIG. 10 illustrates a method for day mode operation.
Figure 11:
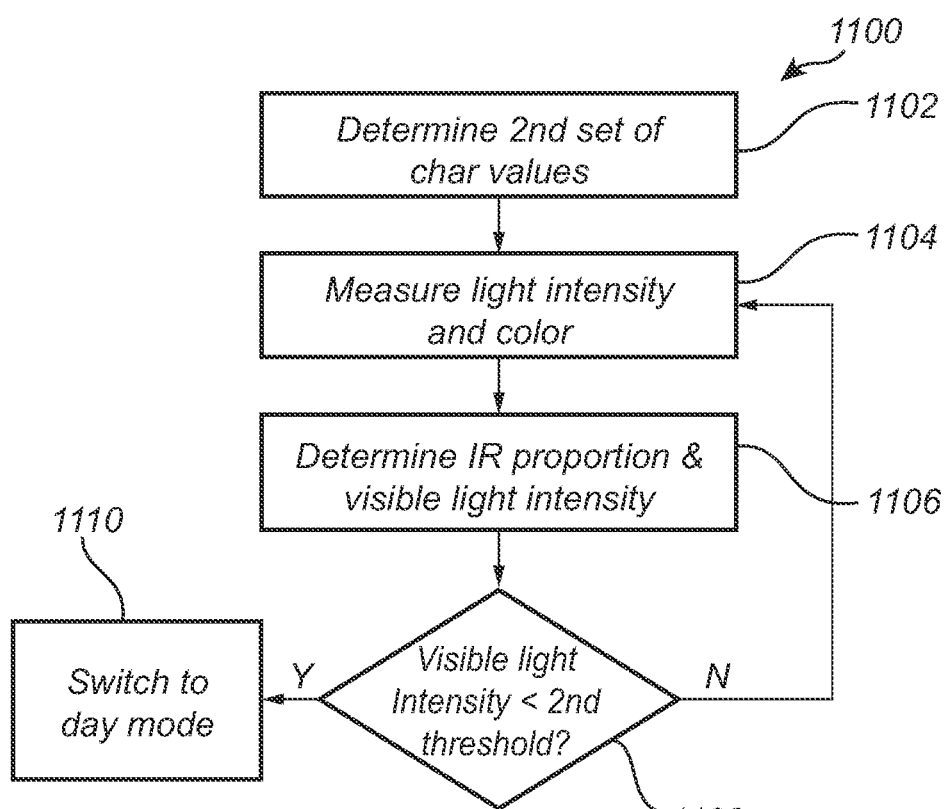
FIG. 11 illustrates a method for night mode operation.

The herein described method is also illustrated in FIG. 10 for day mode operation and in FIG. 11 for night mode operation. As illustrated in FIG. 10, during day mode operation, i.e., when the IR-cut filter is in place, in step 1002, the ambient light intensity and the color components of the ambient light reaching the image sensor of the camera are measured.

In step 1004, from comparing the color components to characteristic values of light sources, a set of light sources which are contributing to the ambient light is determined. In step 1006, the ambient light intensity is compared to a first threshold, and if the intensity is lower than the first threshold, the operation of the camera is switched to night mode, where the IR-cut filter is removed. In case the ambient light intensity is higher than the first threshold, the camera will repeat the steps 1002-1004 again.

In FIG. 11, the operation in night mode is described. To start with, in step 1102 the second set of characteristic values is determined, by combining the determined set of light sources with different levels of IR light. The resulting values form the second set of characteristic values (also called modified characteristic values in this description).

In step 1104, the ambient light intensity and the color components of the ambient light are measured, in the same way as in step 1002 during day mode. In a next step 1106, the proportion of IR in the ambient light is determined by comparing the color components to the second set of characteristic values, and this in turn gives an estimation of the visible light intensity reaching the image sensor.

In step 1108, this estimated visible light intensity is compared to a second threshold, and in case the amount of visible light is higher than this second threshold, the camera switches to day mode and inserts the IR-cut filter. If the intensity of the visible light is below the threshold, the camera will stay in night mode and repeat steps 1104-1108.

In brief, what is described herein is a method of performing better controlled switching between day mode and night mode imaging in a camera, where those illuminants contributing to the ambient light in day mode are considered when determining the visible light during night mode. Characteristic values of those illuminants are mixed with several levels of IR light to simulate the presence of an IR illuminator, and these characteristic values are compared to corresponding values derived from the color components of the ambient light in night mode in order to determine the IR proportion, and from that the amount of visible light.

On a final note, it should be mentioned that other variations to the disclosed embodiments can be understood and effected by the skilled person in practicing the claims, from a study of the drawings, the disclosure, and the appended claims.

The invention claimed is:

1. A method, performed in a video camera, of controlling an infrared cut (IR-cut) filter of the video camera, to switch between day mode and night mode, wherein the camera comprises an image sensor having a color filter array configured to allow the sensor to sense different color components at different regions of the sensor, the method comprising:
   measuring, by the image sensor, an amount of ambient light received by the image sensor and color components of the ambient light received by the image sensor, wherein the color components are determined by calculating the sum or integrated amount of ambient light received by the image sensor within the specific wavelength intervals corresponding to the color components,
   when the video camera is in day mode,
      determining a set of illuminants present in the scene and contributing to the ambient light intensity, by comparing the color components of ambient light received by the image sensor to a first set of characteristic values in the form of color components contributions associated with different illuminants,
      when the amount of ambient light received by the image sensor is lower than a first threshold, switching to night mode, and
   when the camera is in night mode,
      obtaining a second set of characteristic values by mixing a wavelength spectrum of each illuminant in the determined set of illuminants with spectrums of several different levels of added IR light, such that the second set of characteristic values contains a plurality of characteristic values per illuminant, wherein the proportion of IR light per characteristic value in the second set comprises both IR light from the spectrum of the illuminant and from the spectrum of the added level of IR light,
      determining an IR light proportion of the ambient light received by the image sensor, by comparing the color components of ambient light received by the image sensor to the second set of characteristic values in the form of color component contributions associated with different IR light proportions,
      determining a visible light intensity based on the determined IR light proportion and the amount of ambient light received by the image sensor,
      when the visible light intensity is higher than a second threshold, switching to day mode.

2. The method of claim 1, wherein the IR-cut filter blocks IR light from reaching the image sensor in day mode and allows IR light to reach the image sensor in night mode.

3. The method of claim 1, wherein the color filter array is configured to allow the sensor to measure three different color components.

4. The method of claim 3, wherein the three color components are red, blue and green.

5. The method of claim 1, wherein the comparison of the color components to characteristic values comprises
   obtaining a first ratio of a first color component to a third color component or to a sum of the first, a second and the third color component and a second ratio of a second color component to the third color component or to a sum of the first, the second and the third color component, and comparing the obtained ratios to corresponding characteristic values of ratios.

6. The method of claim 1, wherein determining the set of illuminants comprises accessing a first chart containing the first set of characteristic values associated with different illuminants.

7. The method of claim 1, wherein determining the IR light proportion comprises accessing a second chart containing the second set of characteristic values associated with different IR light proportions.

8. The method of claim 1, wherein the method is repeatedly performed at predetermined time intervals.

9. The method of claim 1, wherein the first threshold is lower than the second threshold.

10. The method of claim 1, wherein the spectrums of the several different levels of IR light contains at least three different levels.

11. The method of claim 1, wherein the spectrums of the several different levels of IR light i correspond to wavelength spectrums of an IR LED illumination unit mounted in the vicinity of the camera.

12. A video camera comprising:
   an image sensor having a color filter array configured to allow the sensor to sense different color components at different regions of the sensor, wherein the image sensor is configured to measure an amount of ambient light received by the image sensor and color components of the ambient light received by the sensor, wherein the color components are determined by calculating the sum or integrated amount of ambient light received by the sensor within specific wavelength intervals corresponding to the color components, and
   an infrared cut (IR-cut) filter which is configured to be controlled by the camera to switch between day mode and night mode,
   wherein the camera is configured to,
      when the camera is in day mode,
         determine a set of illuminants present in the scene and contributing to the ambient light intensity, by comparing the color components of ambient light received by the image sensor to a first set of characteristic values in the form of color components contributions associated with different illuminants,
         when the amount of ambient light intensity is lower than a first threshold, switch to night mode,
      when the camera is in night mode, obtain a second set of characteristic values by mixing a wavelength spectrum of each illuminant in the determined set of illuminants with spectrums of several different levels of added IR light, such that the second set of characteristic values contains a plurality of characteristic values per illuminant, wherein the proportion of IR light per characteristic value in the second set comprises both IR light from the spectrum of the illuminant and the spectrum of the added level of IR light, determine an IR light proportion of the ambient light received by the image sensor, by comparing the color components of ambient light received by the image sensor to a second set of characteristic values in the form of color component contributions associated with different IR light proportions, determine a visible light intensity based on the determined IR light proportion and the amount of ambient light received by the image sensor, when the visible light intensity is higher than a second threshold, switch to day mode.

13. The video camera of claim 12, further comprising an IR LED illumination unit, wherein the several different levels of IR light correspond to wavelength spectrums of the IR LED illumination unit.

14. A non-transitory computer readable storage medium having stored thereon instructions for implementing a method, when executed on a device having processing capabilities, the method, performed in a video camera, of controlling an infrared cut (IR-cut) filter of the video camera, to switch between day mode and night mode, wherein the camera comprises an image sensor having a color filter array configured to allow the sensor to sense different color components at different regions of the sensor, the method comprising:

measuring, by the image sensor, an amount of ambient light received by the image sensor and color components of the ambient light received by the image sensor, wherein the color components are determined by calculating the sum or integrated amount of ambient light received by the image sensor within specific wavelength intervals corresponding to the color components, when the camera is in day mode,
determining a set of illuminants present in the scene and contributing to the ambient light intensity, by comparing the color components of ambient light received by the image sensor to a first set of characteristic values in the form of color components contributions associated with different illuminants, when the amount of ambient light received by the image sensor is lower than a first threshold, switching to night mode, and when the camera is in night mode,
obtaining a second set of characteristic values by mixing a wavelength spectrum of each illuminant in the determined set of illuminants with spectrums of several different levels of added IR light, such that the second set of characteristic values contains a plurality of characteristic values per illuminant, wherein the proportion of IR light per characteristic value in the second set comprises both IR light from the spectrum of the illuminant and from the spectrum of the added level of IR light, determining an IR light proportion of the ambient light received by the image sensor, by comparing the color components of ambient light received by the image sensor to the second set of characteristic values in the form of color component contributions associated with different IR light proportions, determining a visible light intensity based on the determined IR light proportion and the amount of ambient light received by the image sensor, when the visible light intensity is higher than a second threshold, switching to day mode.

\* \* \* \* \*